Patented Feb. 14, 1928.

1,659,145

UNITED STATES PATENT OFFICE.

JEAN GEORGES KERN, OF WILMINGTON, DELAWARE, ASSIGNOR TO E. I. DU PONT DE NEMOURS & COMPANY, OF WILMINGTON, DELAWARE, A CORPORATION OF DELAWARE.

MODIFIED BASIC DYES AND PROCESS OF MAKING SAME.

No Drawing. Application filed June 11, 1924. Serial No. 719,329.

This invention relates to modified basic dyes suitable for use in printing and dyeing on fibers of either animal or vegetable origin. My invention, stated broadly, comprises as a new process causing an hydroxy-aromatic-carboxylic acid to react with a basic dye, preferably at an elevated temperature and in the presence of a catalyst such as a mineral acid, and recovering the resulting modified basic dye by any suitable method such as precipitation and filtration.

The process described in this application is a modification of that described in my application, Serial No. 609,105, filed Dec. 26, 1922.

The main object of my invention is to provide a basic color which can be satisfactorily applied to cotton, woolen, or other kinds of fiber by a process which does not involve a steaming operation or a preliminary mordanting of the goods to be dyed or printed.

The acid substances with which basic dyestuffs are treated in accordance with my invention include such hydroxy-aromatic carboxylic acids as gallic acid, digallic acid, tannic acid, and the halogen, sulfo- and nitro-derivatives of such acids; furthermore, there may be included such organic compounds, usually of acid nature, (for example, katanol—a thiophenol derivative) as are capable of reacting with basic dyestuffs to form combinations which, after dissolving in an organic solvent if said combination is insoluble in water, or after treatment with a metal compound if said combination is soluble in water, will produce, when printed or dyed on fiber of animal or vegetable origin, insoluble dye lakes.

The catalysts which I have found to be suitable in the practice of my process are principally such mineral acids as sulfuric acid, hydrochloric acid, phosphoric acid, and boric acid. The reaction between the basic dye and the hydroxy-aromatic-carboxylic acid or equivalent acid substance is preferably carried on at the boiling temperature of the solution and under atmospheric pressure.

The combination resulting from the above mentioned reaction is preferably separated by adding the reaction mass to a larger quantity of water, thereby effecting precipitation, neutralizing any excess acid in the resulting water mixture, salting out if necessary the precipitated modified basic dye, and filtering and drying at a suitable temperature.

My invention may be illustrated by the following specific examples, the basic dyes used in these examples being identified primarily by their Schultz numbers.

*I. Methylene blue.*

200 parts methylene blue BX (Schultz No. 659) (purity 77% as HCl salt) are dissolved in
300 parts alcohol (95%), containing
38.5 parts KOH in solution. After ½ hour heat to 70° C. The base is formed and add to this solution
18.55 parts $H_3PO_4$ 85% } in solution
21.45 parts alcohol 95% }
and then mix the above solution of dyestuff and alcoholic phosphoric acid, while agitating, with
500 parts tannic acid and
400 parts alcohol 95% and heat at a boiling temperature during 1½ hours (temperature 79.5° C.). After this time distill off
550 parts alcohol which takes about 1½ hours and add
550 parts warm water (60–65° C.) while agitating until solution has become clear. Precipitate the dye solution in
7000 parts cold water, thoroughly agitating. Neutralize afterwards with
25.61 parts sodium carbonate and salt out with
200 parts sodium chloride. Let stand for a short time and filter. Dry at a low temperature. Yield: 630 parts of dyestuff, contained in base=23.55% ($TiCL_3N/20$).

In place of 500 parts of tannic acid in the above example I may use 200 parts of beta-resorcylic acid, the rest of the procedure being the same.

II. Methyl violet.

Dissolve in
- 200 parts alcohol (95%) with heat
- 200 parts methyl violet NE (Schultz No. 515) (purity 67.2%), to which a solution of
- 19.16 parts KOH dissolved in
- 100 parts alcohol (95%) are added. Heat at 60° C. during 30 or 40 minutes with agitation and mix this base solution with
- 430 parts tannic acid dissolved in
- 300 parts alcohol (95%) containing
- 21.17 parts $H_3BO_3$ (boric acid) (1PM $H_3BO_3$ to 1PM dyestuff and bring to a boil during 1½ hours. After this time distill off
- 350 parts of alcohol; add the same amount of hot water (60° C.) and precipitate the dye solution in
- 2000 parts cold water while agitating. Neutralize the excess of acid with
- 18.8 parts sodium carbonate (½$Na_2CO_3$ to 1$H_3BO_3$) and add
- 100 parts sodium chloride. Filter and dry at low temperature. Yield about 500 parts powder as 25.04% base.

In place of 430 parts of tannic acid in the above example, I may use 148 parts of salicylic acid (that is, three molecular proportions of salicylic acid to one molecular proportion of methyl violet).

III. Basic brown.

Dissolve
- 21.6 parts potassium hydroxide in
- 100 parts alcohol (95%), and this warm solution is added little by little to a solution, at 40° C. of
- 300 parts basic brown BR (Schultz No. 284) (purity 59.2%) and
- 300 parts alcohol (95%). Heat during 20 min. and mix the base solution thus obtained with
- 568 parts tannic acid and
- 400 parts alcohol (95%), to which solution
- 29.66 parts $H_3PO_4$ (85%) ⅔PM $H_3PO_4$ to 1 P. M. dyestuff and
- 30.39 parts alcohol (95%) is added. Bring to a boil in 1½ hours and after this time distill (temperature 79–81° C.) off
- 550 parts alcohol which takes about 1¼ hours
- 550 parts hot water are then added. Precipitate after shaking the liquor in
- 7000 parts cold water while agitating, neutralize with
- 40.95 parts sodium carbonate, salt out with
- 300 parts sodium chloride, let stand one hour and filter. Dry at a low temperature. Yield: 550 parts dyestuff containing 30% dyestuff base.

For the 568 parts of tannic acid in the above example, there may be substituted 282 parts of 2,5-dihydroxybenzoic acid, the rest of the procedure being the same.

IV. Auramine C.

- 136 parts auramine C (Schultz No. 493) (purity 95% as hydrochloric salt) are dissolved in
- 160 parts alcohol (95%) containing in suspension
- 22.56 parts anhydrous sodium-carbonate. While agitating, heat under reflux condenser at 60° C. until $CO_2$ is no longer evolved. After being sure that all $CO_2$ has been evolved add a solution of
- 435.1 parts tannic acid in
- 400 parts alcohol 2B and raise the temperature to cause the solution to boil (at 79° C.) during 1¼ hours. After this time add a clear solution of
- 26.48 parts boric acid ($H_3BO_3$) in
- 50.0 parts alcohol 2B and
- 50.0 parts glycerine (technical). Keep at the boil and distill off
- 350 parts alcohol to be recovered, which takes about 45 minutes. Then add, while stirring,
- 350 parts hot water (not above 60° C.) and precipitate the solution by pouring into
- 6000 parts cold water while stirring vigorously. It is not necessary to neutralize the boric acid. After adding
- 300 parts sodium chloride the dyestuff precipitates nearly quantitatively. Allow it to stand one hour, filter and dry in vacuo at low temperature.

In place of the tannic acid in the above example, there may be used 157 parts of beta-resorcylic acid, the rest of the procedure being practically the same.

In the above examples it is very important that agitation be carried on very strongly during the precipitation of the rather thick solution in the cold water. It is also desirable to finish the whole operation including filtration the same day.

Special care should be observed in the drying. In general these types of dyestuffs should be dried in a vacuum dryer at a temperature not exceeding 60° C. The raising of the temperature may not hurt the final dyestuff in so far as concerns its printing and dyeing qualities, but its solubility may be reduced; furthermore a dyestuff obtained by drying at too high a temperature is not suitable for use as a pigment.

During the distillation of alcohol the temperature usually rises a few degrees centigrade, no more than 4 degrees, so that the final distillation temperature is about 83° C.

For convenience I have said above that various organic acids other than tannic, such as salicylic and resorcylic, could be substituted in the above examples for tannic acid; but it is to be noted that when such other acids are used, it is not so essential to heat the mixture of basic dye and acid as when said acid is tannic acid, although the heating facilitates the reaction, and serves to increase the coloring power of the product.

The details of the reactions which occur in the above described process have not been determined with certainty, but the following explanation is believed to be correct:

Tannic acid can be considered as the equivalent of digallic acid, and as far as my investigation discloses I may adopt the hypothesis of Fischer and Freudenberg (B. 1912. 45. 2717; 1913. 46. 1127) and consider it as a penta-digalloyl-glucoside of the following constitution:

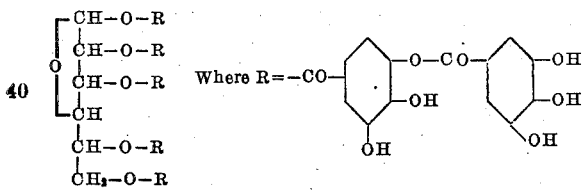

I believe that this is the main compound of the tannin molecule beside leuco-tannic acid, such as described by Nierenstein, (i. e. Bericht d. deutschen Chem. Ges. 38.3641, 1905; 40.917, 1907; 41.77, 3015, 1908; 42.1122, 3552, 1909; 43.628, 1910; Chemiker Zeitung 31.72, 1907; 34.15, 1909) and some free gallic acid.

This compound constituting the ordinary tannin of more or less higher grade is generally, when not too impure, very water-soluble. This compound of colloidal nature is precipitated by acids, salts and by dyestuffs of basic character, but in such a way that only a mechanical precipitation is possible, which can be easily determined by solubilizing those precipitates in a weak acid solution, whereby only 2% of acetic acid for example is necessary.

This same compound contains free hydroxyl groups, and is precipitated by heavy metal-salts such as iron salts, and, in the case in which we are interested, by antimony-salts, giving antimonyl derivatives of the following type, all of which are insoluble:

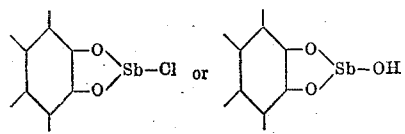

These antimony compounds also have the property of precipitating basic dyestuffs in the cold, but not in a way that would indicate that a chemical reaction was involved. The product is a mechanically precipitated basic dyestuff compound—not at all a lake, as is shown by the fact that the dyestuff base can easily be removed by adding a small amount of acetic acid.

My experiments show that whereas it requires only a little acid to keep the basic dye-tannic acid combination, prepared without heating, in solution (that is, in the absence of heavy metal salts such as those of iron or antimony), such a combination, even in the presence of said solubilizing acid, is precipitated in a comparatively short time if it be heated to a temperature above 60° C. The resulting precipitate requires much stronger acid solution (8–15% acetic acid) to dissolve it than does the mechanical precipitate obtained by mixing the basic dye and the tannic acid in the cold, and fabrics printed or dyed with the more insoluble precipitate which results from heating, have not only a superior shade, but their other fastness properties are much improved.

Although I have mentioned the use of various hydroxy-organic acids other than tannic acid, my investigation has made it evident that best results are obtained when using tannic acid. I believe that heating of the basic dye-acid mixture is essential when using tannic acid in order to effect hydrolysis of that component of tannic acid which I have assumed above to be penta-digalloyl-glucoside, thereby forming free digallic acid. This hydrolysis is facilitated by conducting the heating in the presence of a mineral acid such hydrochloric, boric, phosphoric, sulfuric, acid, etc. The heating, and the proportion and kind of mineral acid used, are such that the glucose molecule will be split from the digalloyl radicals without the digallic acid formed being further hydrolyzed to gallic acid, for I have found that gallic acid yields much inferior products to those obtained with digallic acid.

It will be evident from the above explanation that when the tannic acid is heated with a basic dye in the presence of a mineral acid such as phosphoric acid, the reaction which actually takes place is most probably a chemical reaction between the basic dye and digallic acid. This reaction and its mechanism may be illustrated by the following specific example, the basic dye in this case being methyl violet:—

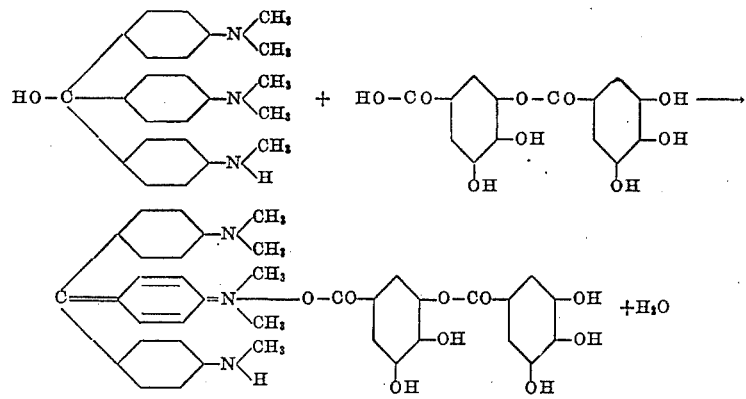

Where more than one molecular proportion of acid is used for each molecular proportion of dye, the additional acid molecules probably add on to the remaining trivalent nitrogen atoms. It will be understood, however, that this explanation is purely theoretical.

The difference between effecting the reaction between the basic dye and the organic acid in the cold on the one hand, and with heating, especially in the presence of a mineral acid, on the other hand may be illustrated by the following example, using as the dye, rhodamine B base, and as the polyhydroxy-organic acid, gallic acid:

Rhodamine B base, having most probably the following structural formula:

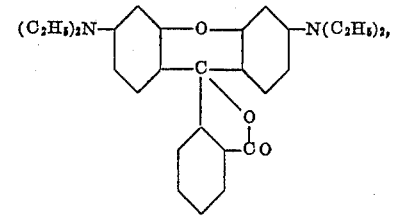

is not water soluble, but it can be dissolved in a little alcohol and the solution diluted somewhat with water without causing precipitation. If gallic acid be added to this diluted solution in the cold, a precipitation occurs, but this precipitate apparently represents only a superficial combination, as evidenced by the very weak coloring power thereof. The formula of this precipitate might be written:

or, structurally,

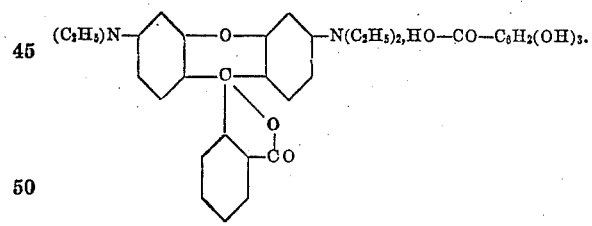

This product is not a dye, but it may be converted into a dye very easily by the action of heat, especially in the presence of a mineral acid or of formic acid. The effect of the heat, promoted by the presence of a strong acid, is to break open the lactonic ring and bring about a substantial change in molecular structure, the resulting product having probably one or the other of the following structural formulas:

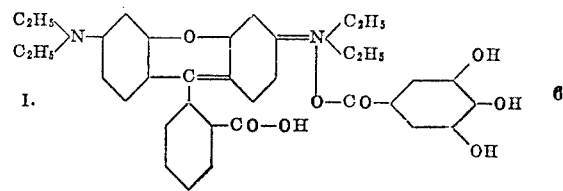

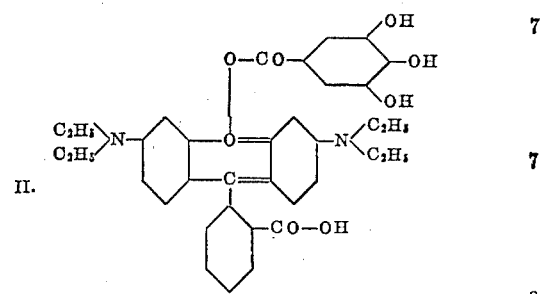

The oxonium salt having the ortho-quinoid structure shown in Formula II, indicates more accurately the properties of the dye lake which is formed, the chromophore group of this lake being very probably the orthoquinoid pyron ring.

As I have indicated above, my invention is applicable in general to the specific examples given above. As additional examples of basic dyes which may be used as starting materials for producing my new dyes, there may be mentioned:

Methylene gray, rhoduline red B, rhodamine S, rhodamine 6 G (Schultz No. 571), safranine T (Schultz No. 679), phosphine G (Schultz No. 602), Victoria green (Schultz No. 495), crystal violet (Schultz No. 516), Victoria blue R (Schultz No. 558), Victoria blue B (Schultz No. 559), and rhoduline red G.

In the preparation of dye baths using my new dye, the latter may be dissolved in a suitable amount of an aqueous solution of formic, acetic, or lactic, acid, the solution preferably containing from 10 to 20% of the acid. It is a peculiarity of my new type of modified basic dye that it must be subjected to the action of a solution containing a substantial concentration, usually 8% or more, of a simple aliphatic acid before it will dissolve therein. Examples of printing pastes and dye liquors containing the new modified dyes are given in my copending application Serial No. 609,105 referred to above.

I claim:

1. As a dye composition a basic dye compound having excellent fastness properties which is insoluble in pure water and in water containing 2% of acetic acid, but is soluble in water containing 15% of acetic acid, said basic dye compound yielding, when hydrolyzed in the presence of a sodium hydroxide solution, a basic dye base and the sodium salt of an hydroxy-aromatic carboxylic acid.

2. As a dye composition a basic dye compound having excellent fastness properties which is insoluble in pure water and in water containing 2% of acetic acid, but is soluble in water containing 15% of acetic acid, said basic dye compound yielding, when hydrolyzed in the presence of a sodium hydroxide solution, a basic dye base and the sodium salt of a polyhydroxy-aromatic carboxylic acid.

3. As a dye composition a basic dye compound having excellent fastness properties which is insoluble in pure water and in water containing 2% of acetic acid, but is soluble in water containing 15% of acetic acid, said basic dye compound yielding, when hydrolyzed in the presence of a sodium hydroxide solution, a basic dye base and the sodium salt of a gallic acid.

4. A dye composition obtainable by heating an alcoholic solution of a basic dye and an hydroxy-aromatic-carboxylic acid, said composition being insoluble in pure water, but soluble in water containing 15% of acetic acid.

5. A dye composition obtainable by heating to a temperature above 60° C. a solution of a basic dye and an hydroxy-aromatic carboxylic acid, said composition being insoluble in pure water, but soluble in water containing 15% of acetic acid.

6. A dye composition obtainable by heating to a temperature above 60° C., in the presence of a mineral acid, an alcohol solution of a basic dye and an hydroxy-carboxylic acid, said composition being insoluble in pure water, but soluble in water containing 15% of acetic acid.

7. A dye composition obtainable by heating to a temperature above 60° C., in the presence of a mineral acid, an alcohol solution of a basic dye and a polyhydroxy-aromatic carboxylic acid, said composition being insoluble in pure water; but soluble in water containing 15% of acetic acid.

8. A dye composition obtainable by heating to a temperature above 60° C., in the presence of a mineral acid, an alcohol solution of a basic dye and tannic acid, said composition being insoluble in pure water; but soluble in water containing 15% of acetic acid.

9. The process of producing a modified basic dye insoluble in water, which comprises heating together a basic dye and a hydroxy-aromatic acid to a temperature above 60° C.

10. The process of producing a modified basic dye insoluble in water, which comprises heating together a basic dye, a hydroxy-aromatic acid, and a solvent for said substances to a temperature above 60° C.

11. The process of producing a modified basic dye insoluble in water, which comprises heating to a temperature above 60° C. a basic dye and a hydroxy-aromatic-carboxylic acid in the presence of a solvent for the product resulting from the reaction between said two substances.

12. The process of producing a modified basic dye insoluble in water, which comprises heating to a temperature above 60° C. a basic dye and a hydroxy-aromatic-carboxylic acid in the presence of a solvent for the product resulting from the reaction between said two substances and in the presence of a mineral acid.

13. The process of producing a modified basic dye which comprises heating to a temperature above 60° C. an alcoholic solution of a basic dye and a hydroxy-aromatic carboxylic acid.

14. The process of producing a modified basic dye which comprises heating to a temperature above 60° C. an alcoholic solution of a basic dye and a hydroxy-aromatic carboxylic acid in the presence of a mineral acid.

15. A process as defined in claim 9 in which the hydroxy-aromatic acid is tannic acid.

16. A process as defined in claim 11 in which the hydroxy-aromatic carboxylic acid is a polyhydroxy-aromatic carboxylic acid.

17. A process as defined in claim 11 in which the hydroxy-aromatic carboxylic acid is tannic acid.

18. A process as defined in claim 12 in which the carboxylic acid is a polyhydroxy-aromatic carboxylic acid.

19. A process as defined in claim 12 in which the carboxylic acid is tannic acid.

20. A process as defined in claim 13 in which the carboxylic acid is a polyhydroxy-aromatic carboxylic acid.

21. A process as defined in claim 13 in which the carboxylic acid is tannic acid.

22. A process as defined in claim 14 in which the carboxylic acid is a polyhydroxy aromatic carboxylic acid.

23. A process as defined in claim 14 in which the carboxylic acid is tannic acid.

24. A process as defined in claim 12 in which the mineral acid is phosphoric acid.

25. A process as defined in claim 14 in which the mineral acid is phosphoric acid.

26. The process of producing a modified basic dye which comprises heating an alcoholic solution of a basic dye and a polyhydroxy benzoic acid in the presence of phosphoric acid to a temperature above 60° C. but such that said solution remains in the liquid phase during the reaction.

27. The process of producing a modified basic dye which comprises heating an alcoholic solution of a basic dye and a dihydroxy-benzoic acid in the presence of phosphoric acid to a temperature above 60° C. and maintaining the temperature above 60° C. until there is formed a product insoluble in 2% acetic acid solution.

28. The process of producing a modified basic dye which comprises heating an alcoholic solution of a basic dye and tannic acid in the presence of phosphoric acid to a temperature above 60° C. until there is formed a product insoluble in 2% acetic acid solution.

29. A process as defined in claim 26 in which the polyhydroxy benzoic acid is tannic acid.

30. A process as defined in claim 11 in which at least one molecular proportion of carboxylic acid is used for each molecular proportion of basic dye present.

31. A process as defined in claim 12 in which at least one molecular proportion of carboxylic acid is used for each molecular proportion of basic dye present.

32. A process as defined in claim 14 in which at least one molecular proportion of carboxylic acid is used for each molecular proportion of basic dye present.

33. The process of producing a modified basic dye, insoluble in water, which comprises heating together a basic dye and a hydroxy-aromatic-carboxylic acid to a temperature above 60° C., in which process at least one molecular proportion of carboxylic acid is used for each molecular proportion of basic dye present.

34. A process as defined in claim 11 in which at least two molecular proportions of carboxylic acid are used for each molecular proportion of basic dye present.

35. A process as defined in claim 12 in which at least two molecular proportions of carboxylic acid are used for each molecular proportion of basic dye present.

36. A process as defined in claim 14 in which at least two molecular proportions of carboxylic acid are used for each molecular proportion of basic dye present.

In testimony whereof I affix my signature.

JEAN GEORGES KERN.